United States Patent [19]

Okuyama et al.

[11] Patent Number: 5,173,857
[45] Date of Patent: Dec. 22, 1992

[54] AUTOMOTIVE SUSPENSION SYSTEM WITH FEATURE OF PREVENTION OF SUDDEN CHANGE OF VEHICULAR ATTITUDE AT VEHICULAR ATTITUDE INFLUENCING ACCELERATION BEYOND CRITICAL MAGNITUDE

[75] Inventors: Yuji Okuyama, Tochigi; Katsuya Kii, Nara; Kazuo Mori, Tochigi, all of Japan

[73] Assignee: Nissan Motor Company, Limited, Japan

[21] Appl. No.: 576,584

[22] Filed: Sep. 4, 1990

[30] Foreign Application Priority Data

Sep. 4, 1989 [JP] Japan .................................. 1-228810

[51] Int. Cl.⁵ .............................................. B60G 17/01
[52] U.S. Cl. ................................ 364/424.05; 280/707
[58] Field of Search ...................... 364/424.05, 424.01; 280/707

[56] References Cited

U.S. PATENT DOCUMENTS

| | | | |
|---|---|---|---|
| 4,686,626 | 8/1987 | Kuroki et al. | 364/424.05 |
| 4,907,154 | 3/1990 | Yasuda et al. | 364/424.05 |
| 4,916,632 | 4/1990 | Doi et al. | 364/508 |
| 4,924,392 | 5/1990 | Kurosawa | 364/424.05 |
| 4,949,262 | 8/1990 | Buma et al. | 364/424.05 |
| 4,977,506 | 12/1990 | Hara et al. | 364/424.05 |
| 5,072,392 | 12/1991 | Tamiguchi | 364/424.05 |

FOREIGN PATENT DOCUMENTS 395108 10/1990 European Pat. Off. .

Primary Examiner—Thomas G. Black
Attorney, Agent, or Firm—Lowe, Price, Leblanc & Becker

[57] ABSTRACT

A suspension control system performs vehicular attitude regulating operation by adjusting damping characteristics at respective of suspension systems. For controlling damping characteristics, a suspension control command value is derived on the basis of an acceleration exerted on the vehicular body, which acceleration influences vehicular attitude. The suspension control command value is variable depending upon the magnitude of the vehicular attitude influencing acceleration. Variation rate of the suspension control command value versus variation of the vehicular attitude influencing acceleration is variable in such a manner that increasing rate of the suspension control command value decreases according to increasing of the acceleration.

24 Claims, 7 Drawing Sheets

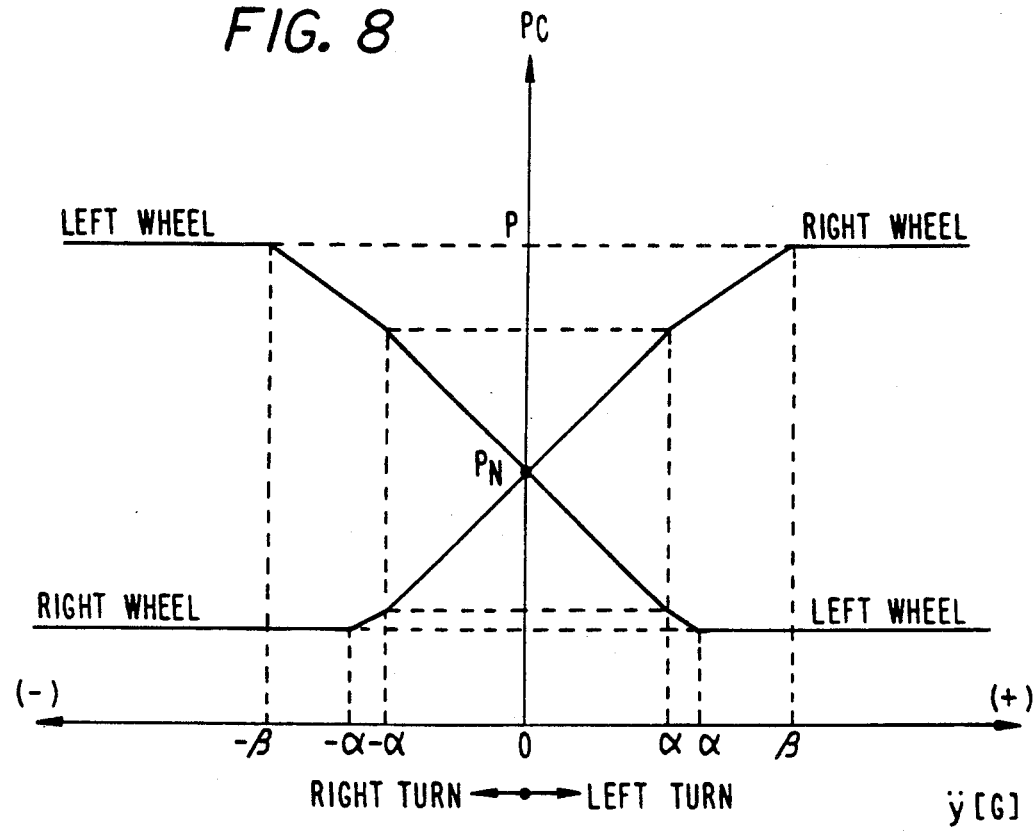
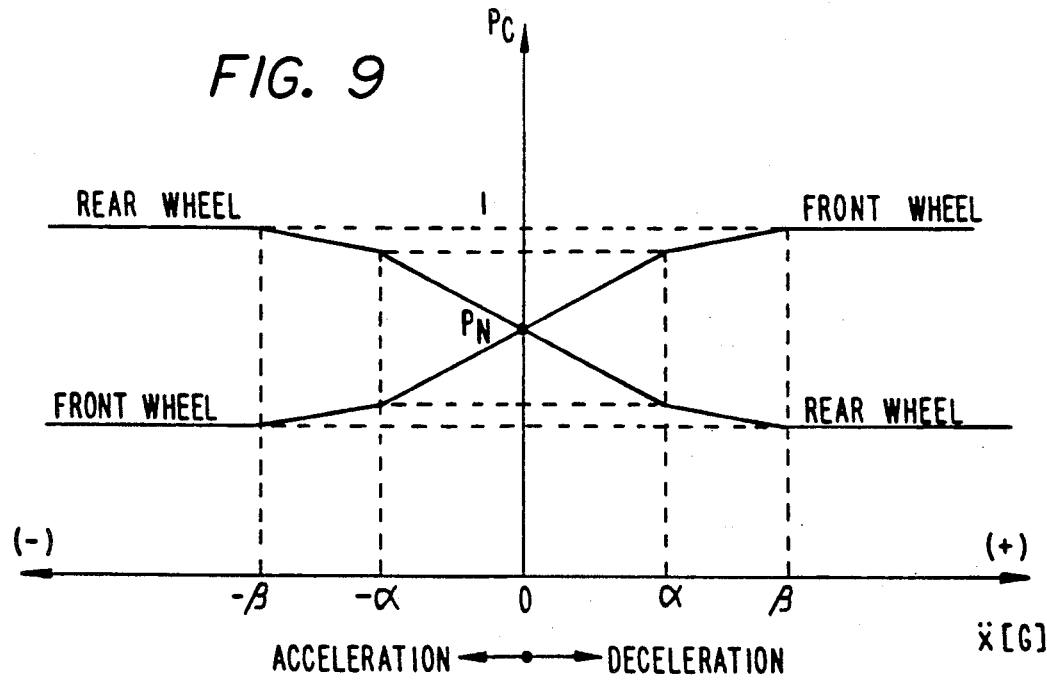

AUTOMOTIVE SUSPENSION SYSTEM WITH FEATURE OF PREVENTION OF SUDDEN CHANGE OF VEHICULAR ATTITUDE AT VEHICULAR ATTITUDE INFLUENCING ACCELERATION BEYOND CRITICAL MAGNITUDE

BACKGROUND OF THE INVENTION

1. Field of the Invention

The present invention relates generally to an active suspension system for an automotive vehicle. More specifically, the invention relates to an active suspension system which performs vehicular height regulation and vehicular attitude regulation and further provides modulate transition at a vehicular attitude influenced by acceleration at a critical magnitude.

2. Description of the Background Art

Japanese Patent First (unexamined) Publication (Tokkai) Showa 62-295714 and 63-62-235112 disclose typical structures of active suspension systems. The active suspension system disclosed in the former publication is designed to perform anti-rolling suspension control on the basis of lateral acceleration exerted on the vehicular body. The shown system adjusts fluid pressure working chambers in a hydraulic cylinder for adjusting damping force resisting against rolling moment and thereby suppressing vehicular rolling. On the other hand, the later publication discloses an active suspension system which performs anti-pitching control on the basis of longitudinal acceleration exerted on the vehicular body. The system also adjusts the fluid pressure in the working chambers in the hydraulic cylinders so as to suppress vehicular pitching motion. The later publication further discloses the use of variable gains for controlling front and rear suspension systems, with which gains the longitudinal acceleration indicative signal is amplified to derive front and rear suspension control commands. The variable gain provided in the later publication is expected to provide higher precision and optimum suspension control performance.

In such prior proposed active suspension systems, the fluid pressure in the working chamber is maintained at a predetermined neutral pressure as long as the lateral and/or longitudinal acceleration exerted on the vehicular body is maintained at zero. When vehicle rolls, the fluid pressure at left and right suspension systems are adjusted by left and right suspension control commands having equal values but having opposite phases or polarities for hardening suspension systems oriented outside of the curve and softening suspension oriented inside of the curve. Similarly, when vehicular pitching is caused, front and rear suspension control commands having the equal value but opposite phases are supplied to the front and rear suspension system, for suppressing vehicular pitching motion magnitude. When acceleration greater than a predetermined maximum is exerted on the vehicular body, the fluid pressure in the working chamber is adjusted to a predetermined maximum and minimum level and maintained thereat. The predetermined maximum acceleration may be set depending upon the capacity of the hydraulic cylinder, acceptable magnitude of vehicular attitude change, desired critical level of corning performance and so forth.

With such prior proposed active suspension system, vehicular attitude can be successfully regulated as long as the acceleration exerted on the vehicular body is maintained below the predetermined maximum level. On the other hand, when the acceleration becomes greater than maximum level, sudden change of vehicular attitude is caused to cause degradation of the riding comfort and driving stability.

SUMMARY OF THE INVENTION

Therefore, it is an object of the present invention to provide an active suspension system which prevents sudden attitude change even at the occasion, during which acceleration greater than a predetermined maximum acceleration is exerted.

In order to accomplish aforementioned and other objects, an active suspension control system, according to the present invention, performs vehicular attitude regulating operation by adjusting damping characteristics at respective parts of the suspension system. For controlling clamping characteristics, a suspension control command value is derived on the basis of an acceleration exerted on the vehicular body, which acceleration influences vehicular attitude. The suspension control command signal value is gradually variable depending upon the magnitude of the vehicular attitude influencing acceleration. Variation rate of the suspension control command value according to variation of the vehicular attitude influencing acceleration is gradually variable in such a manner that increasing rate of the suspension control command value decreases according to increasing of the acceleration.

According to one aspect of the invention, a suspension control system for an automotive vehicle comprises:

a plurality of suspension systems, each disposed between a vehicular body and a road wheel for damping relative displacement between the vehicular body and a road wheel, the suspension system being gradually variable of suspension characteristics depending upon suspension control command signal;

a sensor means for monitoring inertia force exerted on the vehicular body for causing vehicular attitude change, the sensor means producing a sensor signal representation of monitored magnitude of the inertia force;

a control means for receiving the sensor signal for deriving the suspension control command which is gradually variable between a predetermined minimum value corresponding to a first value of the sensor signal, to a maximum value corresponding to a second value of the sensor signal, which suspension control command signal is gradually variable according to variation of the sensor signal value, the control means gradually varying a variation rate of the suspension control command according to variation of the sensor signal value so that the variation rate is smaller at least in a sensor signal value range in the vicinity of the first and second values.

The sensor signal value may be variable across the first and second values and further across a third value set between the first and second values and corresponding to the vehicular state where the inertia force exerted on the vehicular body is zero, and the variation rate of the suspension control command signal in the sensor signal range in the vicinity of the third value is greater than the variation rate in the vicinity of the first and second values. In such case, the suspension control command signal gradually varies according to variation of the sensor signal value at a first variation rate in a sensor signal value range between the third value and a fourth value greater than the third value and smaller than the first value, and a second variation rate in a sensor signal value range between the fourth value and the first value. Also, the suspension control command signal may gradually vary according to variation of the sensor signal value at a third variation rate in a sensor signal value range between the third value and a fifth value smaller than the third value and greater than the second value, and a fourth variation rate in a sensor signal value range between the fifth value and the second value. In the alternative, the variation rate may also be continuously varied so that greater variation rate is obtained in the vicinity of the third value and smaller variation rate is obtained in the vicinity of the first and second values.

The suspension control command signal may be provided for one side of the vehicular body for hardening suspension control and for the other side of the vehicular body for softening suspension control for regulating vehicular attitude, the sensor signal value is gradually variable across the first and second values and further across a third value set between the first and second values and corresponding to the vehicular state where the inertia force exerted on the vehicular body is zero, and the variation rate of the hardening suspension control command signal in the sensor signal range in a first sensor signal value range defined in the vicinity of the third is greater than the variation rate in a second sensor signal value range defined in the vicinity of the first value, and the variation rate of the softening suspension control command signal in a third range defined in the vicinity of the third sensor signal value value is greater than the variation rate in a fourth sensor signal value range defined in the vicinity of the second value. In such case, the fourth sensor signal value range is smaller than the second sensor signal value range.

According to another aspect of the invention, an anti-rolling suspension control system for an automotive vehicle comprises:

a plurality of suspension systems, each disposed between a vehicular body and a road wheel for damping relative displacement between the vehicular body and a road wheel, the suspension system being gradually variable of suspension characteristics depending upon suspension control command;

a sensor means for monitoring lateral acceleration exerted on the vehicular body for causing vehicular attitude change, the sensor means producing a sensor signal representative of monitored magnitude of the inertia force;

a control means for receiving the sensor signal for deriving the suspension control command signal which is gradually variable between a predetermined minimum value corresponding to a first value of the sensor signal, to a maximum value corresponding to a second value of the sensor signal, which suspension control command signal is gradually variable according to variation of the sensor signal value, the control means gradually varying a variation rate of the suspension control command signal according to variation of the sensor signal value so that the variation rate is smaller at least in a sensor signal value range in the vicinity of the first and second values.

According to a further aspect of the invention, an anti-pitching suspension control system for an automotive vehicle comprises:

a plurality of suspension systems, each disposed between a vehicular body and a road wheel for damping relative displacement between the vehicular body and a road wheel, the suspension system being variable of suspension characteristics depending upon suspension control command signal;

a sensor means for monitoring longitudinal acceleration exerted on the vehicular body for causing vehicular attitude change, the sensor means producing a sensor signal representative of monitored magnitude of the inertial force;

a control means for receiving the sensor signal for deriving the suspension control command signal which is gradually variable between a predetermined minimum value corresponding to a first value of the sensor signal, to a maximum value corresponding to second value of the sensor signal, which suspension control command signal is gradually variable according to variation of the sensor signal value, the control means varying a variation rate of the suspension control command signal according to variation of the sensor signal value so that the variation rate is smaller at least in a sensor signal value range in the vicinity of the first and second values.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings:

FIG. 8 is a chart showing variation characteristics of control pressure in anti-rolling control;

FIG. 9 is a chart showing variation characteristics of control pressure in anti-pitching control.

DESCRIPTION OF THE PREFERRED EMBODIMENT

Figure 1:
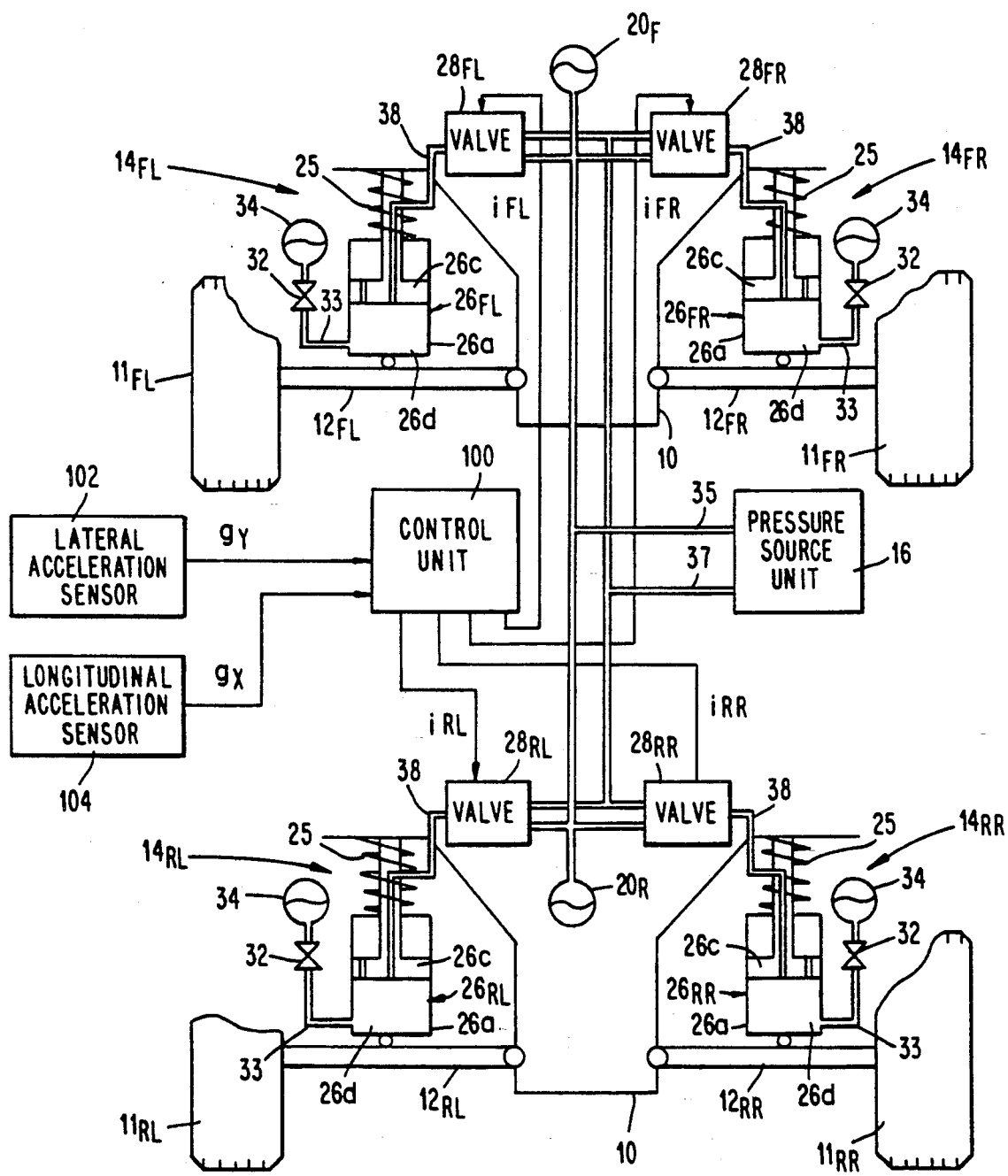
FIG. 1 is a diagrammatic illustration of the preferred embodiment of an active suspension system according to the present invention.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 12FL, 12FR, 12RL and 12RR of front-left, front-right, rear-left and rear-right suspension mechanism 14FL, 14FAR, 14AIL and 14RR and rotatably supporting front-left, front-right, rear-left and rear-right wheels 11FL, 11FR, 11RL and 11RR. The suspension mechanism as generally referred to will be hereafter represented by the reference numeral "14". Respective front-left, front-right, rear-left and rear-right suspension mechanisms 14FL, 14FAR, 14AIL and 14RR have hydraulic cylinders 26FL, 26FAR, 26AIL and 26RR which will be represented by the reference numeral "26" as generally referred to.

Each of the hydraulic cylinder 26 is disposed between the vehicular body 10 and the suspension member 12FL, 12FR, 12RL and 12RR to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d. The piston 26c is connected to the associated one of suspension member 12 via a piston rod 26b. A suspension coil spring 25 are also provided in respective of suspension mechanisms. However, in contrast to the normal or ordinary suspension systems, the suspension coil spring to be employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FAR, 28AIL and 28RR via a pressure control line 38. The pressure control valve 28FL, 28FAR, 28AIL and 28RR will be hereafter represented by the reference numeral "28" as generally referred to. The pressure control valve 28 has a control port 28c communicated with the working chamber 26d via the pressure control line 38. The pressure control valve 28 also has an inlet port 28s and a drain port 28r. The inlet port 28s of the pressure control valve 28 is connected to o a pressure source unit 16 via a supply line 35, and the drain port 28r thereof is communicated with a drain line 37. The pressure control valve 28 incorporates a proportioning solenoid 26e for adjusting valve position according to magnitude of suspension control signal $I_{FL}$, $I_{FR}$, $I_{RL}$ and $I_{RR}$ supplied from the control unit 100. The suspension control signal $I_{FL}$, $I_{FR}$, $I_{RL}$ and $[E][-]_{RR}$ are current signal having a variable current value representative of commanding pressure in the working chamber. A branch circuit is provided for connecting the working chamber 26d to a pressure accumulator 34 via a flow path 33 and a flow restricting means, such as an orifice 32. This pressure accumulator 34 may be hereafter referred to as "low pressure accumulator". Another pressure accumulators 20F and 20R are provided in the supply line 35 for accumulating the excessive pressure generated in the pressure source unit 16.

The pressure control valves 28 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following prior applications or publications:

U.S. patent application Ser. No. 052,934, filed on May 22, 1989, corresponds to U.S. Pat. No. 4,903,983 issued on Feb. 27, 1990;

U.S. patent application Ser. No. 059,888, filed on Jun. 9, 1987, corresponding European Patent Application has been published as First Publication No. 02 49 209, corresponds to U.S. Pat. No. 5,089,966 issued on Feb. 18, 1992;

U.S. patent application Ser. No. 060,856, filed on Jun. 12, 1987, corresponding European Patent Application has been published as First Publication No. 02 49 227, corresponds to U.S. Pat. No. 5,056,811 issued on Oct. 15, 1991;

U.S. patent application Ser. No. 060,909, filed on Jun. 12, 1987, corresponds to U.S. Pat. No. 4,909,534 issued on Mar. 20, 1990;

U.S. patent application Ser. No. 060,911, filed on Jun. 12, 1987, corresponds to U.S. Pat. No. 4,801,155 issued on Jan. 31, 1989;

U.S. patent application Ser. No. 176,246, filed on Mar. 31, 1988, the corresponding European Patent Application has been published as First Publication No. 02 85 153, corresponds to U.S. Pat. No. 4,888,696 issued on Dec. 19, 1989;

U.S. patent application Ser. No. 178,066, filed on Apr. 5, 1988, the corresponding European Patent Application has been published as First Publication No. 02 86 072, corresponds to U.S. Pat. No. 4,848,790 issued on Jul. 18, 1989;

U.S. patent application Ser. No. 167,835, filed on Mar. 4, 1988, corresponds to U.S. Pat. No. 4,865,348 issued on Sep. 12, 1989;

U.S. patent application Ser. No. 244,008, filed on Sep. 14, 1988, corresponds to U.S. Pat. No. 4,938,499 issued on Jul. 3, 1990;

U.S. patent application Ser. No. 255,560, filed on Oct. 11, 1988, corresponds to U.S. Pat. No. 4,943,084 issued on Jul. 24, 1990;

U.S. patent application Ser. No. 266,763, filed on Nov. 3, 1988, corresponds to U.S. Pat. No. 4,967,360 issued on Oct. 30, 1990;

U.S. patent application Ser. No. 261,870, filed on Oct. 25, 1988, corresponds to U.S. Pat. No. 5,041,977 issued on Aug. 20, 1991;

U.S. patent application Ser. No. 263,764, filed on Oct. 28, 1988, corresponds to U.S. Pat. No. 4,905,151 issued on Feb. 27, 1990;

U.S. patent application Ser. No. 277,376, filed on Nov. 29, 1988, corresponds to U.S. Pat. No. 4,919,440 issued on Apr. 24, 1990;

U.S. patent application Ser. No. 303,338, filed on Jan. 26, 1989, corresponds to U.S. Pat. No. 5,013,061 issued on May 7, 1991;

U.S. patent application Ser. No. 310,130, filed on Mar. 22, 1989, corresponds to U.S. Pat. No. 4,973,079 issued on Nov. 27, 1990;

U.S. patent application Ser. No. 327,460, filed on Mar. 22, 1989, corresponds to U.S. Pat. No. 4,911,469 issued on Mar. 27, 1990;

U.S. patent application Ser. No. 303,339, filed on Jan. 26, 1989, corresponds to U.S. Pat. No. 4,948,165 issued on Aug. 14, 1990;

U.S. patent application Ser. No. 331,602, filed on Mar. 31, 1989, corresponds to U.S. Pat. No. 4,911,468 issued on Mar. 27, 1990;

U.S. patent application Ser. No. 331,653, filed Mar. 31, 1989, corresponds to U.S. Pat. No. 4,911,470 issued on Mar. 27, 1990;

U.S. patent application Ser. No. 364,477, filed on Jun. 12, 1989, corresponds to U.S. Pat. No. 5,087,068 issued on Feb. 11, 1992;

U.S. patent application Ser. No. 365,468, filed on Jun. 12, 1989, still pending.

The disclosures of the foregoing co-pending applications are herein incorporated by reference for the sake of disclosure.

The pressure control valve 28 employed in the shown embodiment incorporates a proportioning solenoid 28e for adjusting valve position and thus adjusts control pressure to be supplied to the working chamber 26d of the associated one of the hydraulic cylinder 26. In practice, the pressure control valve employed in the shown embodiment is designed as pilot operated valve, in which the pilot pressure is adjusted by the position of the proportioning solenoid.

For adjusting control pressure at the control port 28c, the proportioning solenoid 28e, a suspension control command signal which is in a form of a current signal having a current variable depending upon the command signal value. The suspension control command is generated by a control unit 100. In order to perform, height regulation and attitude regulation for the vehicular body, the control unit 100 is connected to a plurality of sensors for monitoring various suspension control parameters. Parameters for performing suspension control and data processing for deriving the suspension control command signal values have been discussed in various co-pending applications set forth above. Amongst, the following disclosure may be concentrated for anti-rolling suspension control which may be combined with any other logic of suspension control.

Though the control may perform various controls, the following discussion will be concentrated to anti-rolling and anti-pitching control to be performed by the control unit 100. In order to do this, the control unit 100 is connected to a lateral acceleration sensor 102 and a longitudinal acceleration sensor 104. The lateral acceleration sensor 102 is designed to produce a lateral acceleration indicative signal $g_y$ representative of a magnitude of lateral acceleration exerted on the vehicular body 10. For enabling this, the lateral acceleration sensor 102 may be mounted on an appropriate position of the vehicular body. On the other hand, the longitudinal acceleration sensor 104 is designed to produce a longitudinal acceleration indicative signal $g_x$ representative of the longitudinal acceleration exerted on the vehicular body. Both of the lateral acceleration indicative signal $g_y$ and the longitudinal acceleration indicative signal $g_x$ are analog signals having voltage level variable depending upon the magnitude of the lateral and longitudinal acceleration exerted on the vehicular body.

The control unit 100 comprises analog-to-digital (A/D) converters 106Y and 106X to convert the analog from lateral and longitudinal acceleration indicative signals $g_y$ and $g_x$ into digital signals. The A/D converters 106Y and 106X feed digital form lateral and longitudinal acceleration indicative signals $g_y$ and $g_x$ to a microprocessor 110 which comprises an input/output interface 112, an arithmetic circuit 114 and a memory unit 116. The microprocessor 110 processes the lateral and longitudinal acceleration indicative signals $g_y$ and $g_x$ to produce front-left, front-right-left and rear-right suspension control command signals $V_{FL}$, $V_{FR}$, and $V_{RR}$ in forms of voltage signals having voltage level representative of required magnitude of control pressure Pc to be supplied from the pressure control valves 28FL, 28FR, 28RL and 28RR to respectively corresponding working chambers 26d of the hydraulic cylinders 26FL, 26FR, 26RL and 26RR. The front-left, front-right-rear-left and rear-right suspension control command signals $V_{FL}$, $F_{FR}$, $V_{RL}$ and $V_{RR}$ are converted into analog signals by digital-to-analog (D/A) converters 120FL, 120FR, 120RL and 120RR. The D/A converted front-left, front-right-rear-left and rear-right suspension control command signals $V_{FL}$, $V_{FR}$, $V_{RL}$ and $V_{RR}$ are supplied to driver circuits 122FL, 122FR, 122RL and 122RL. The driver circuits 122FL, 122FR, 122RL and 122RR comprise current signal generator, such as floating type constant current generator, for producing current signal form front-left, front-right-rear-left and rear-right suspension control signals [E]I[−]FL, $I_{FR}$, $I_{RL}$ and $I_{RR}$ having current value variable corresponding to the suspension control command signal values $V_{FL}$, $V_{FR}$, $V_{RL}$ and $V_{RR}$. The suspension control signals $I_{FL}$, $I_{FR}$, $I_{RL}$ and $I_{RR}$ are fed to proportioning solenoids of respectively corresponding pressure control valves 28FL, 28RL, 28RL and 28RR for controlling pilot pressure therein and whereby controlling the control pressure Pc to be supplied to the corresponding working chambers 26d.

Figure 2:
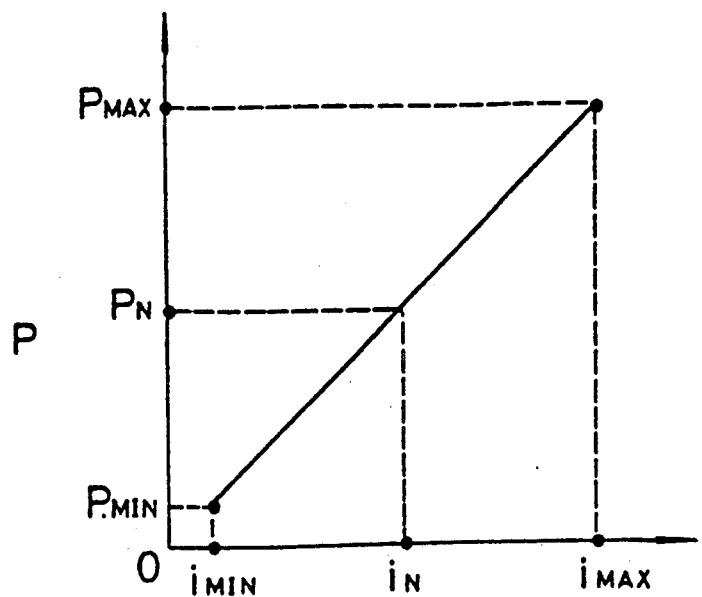
FIG. 2 is a chart showing variation of control pressure level Pc relative to current level of a suspension control signal i.

As shown in FIG. 2, the control pressure Pc to be supplied from the pressure control valve 28 to the working chamber 26d via the control line 38 is variable between a predetermined maximum pressure $P_{max}$ and a predetermined minimum pressure $P_{min}$ across a predetermined neutral pressure $P_N$ while the suspension control signal varies its current level between a predetermined maximum value $I_{max}$ and a predetermined minimum value $I_{min}$. The neutral pressure $P_N$ of the control pressure Pc is produced in response to the suspension control signal having a value $I_N$.

Figure 3:
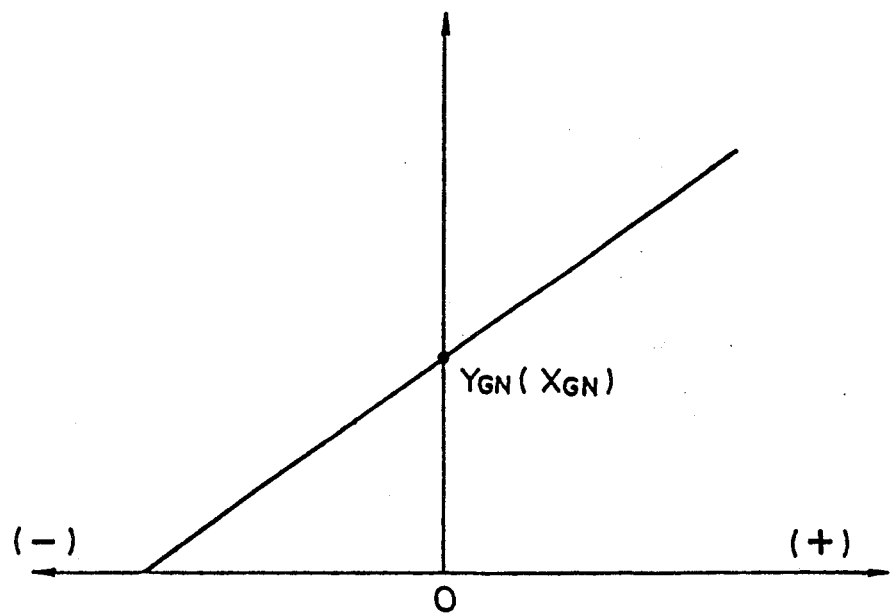
FIG. 3 is a chart showing variation of output level of acceleration sensor in relation to acceleration exerted on the vehicular body.
Figure 4:
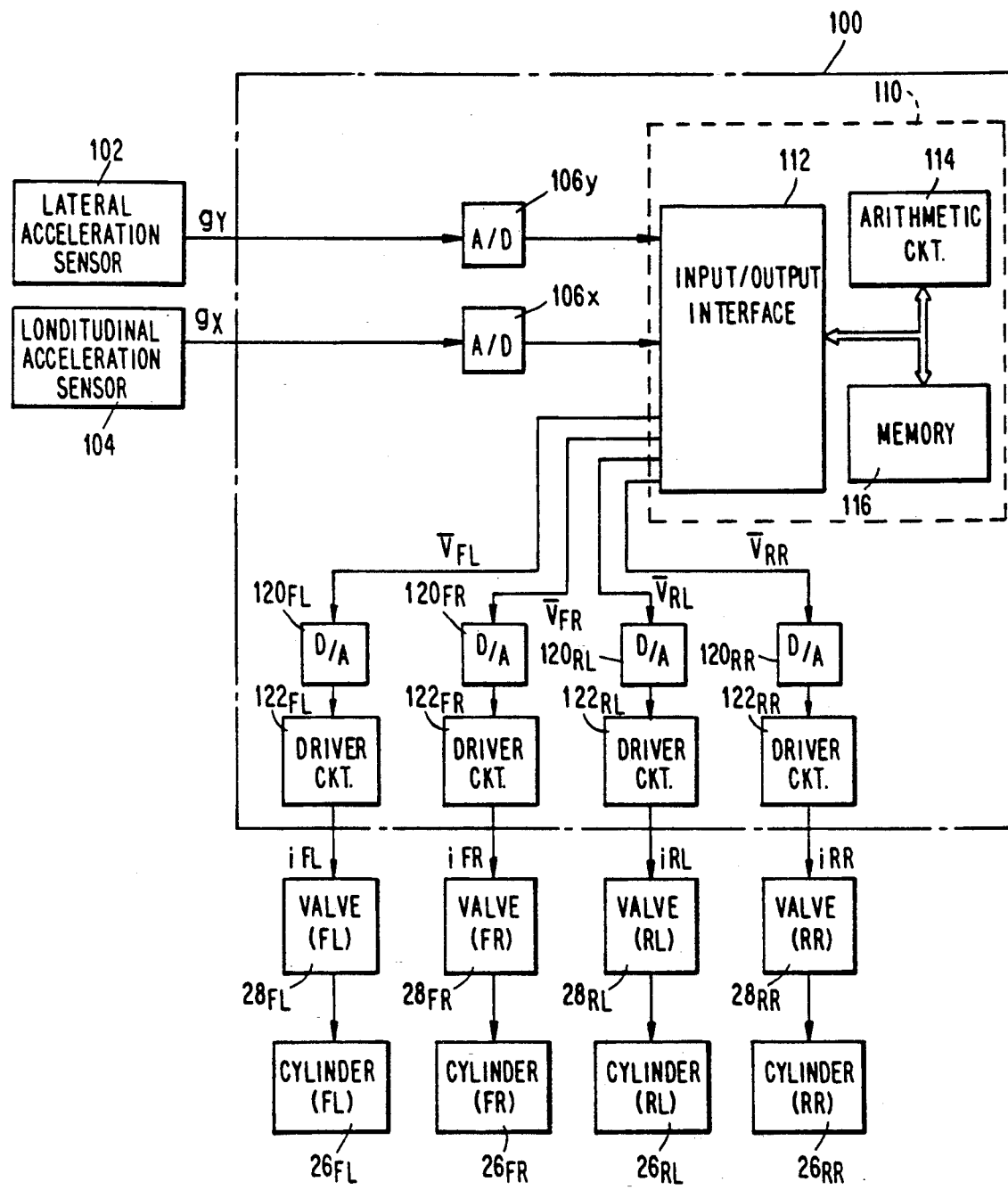
FIG. 4 is a block diagram of a suspension control system employed in the shown embodiment of the active suspension system according to the invention.

On the other hand, as seen from FIG. 3, the output levels of the lateral and longitudinal acceleration sensors 102 and 104 are variable according to the characteristics as illustrated. Namely, when the lateral or longitudinal acceleration exerted on the vehicular body is zero, the output level of the lateral or longitudinal acceleration sensor 102 and 104 is maintained at a predetermined neutral level $Y_{GN}$ or $X_{GN}$. In the shown embodiment, the lateral acceleration sensor 102 increases the output level from the neutral level $Y_{GN}$ in response to increasing lateral acceleration directed right. On the other hand, the lateral acceleration sensor 102 decrease the output level from the neutral level $Y_{GN}$ in response to increasing lateral acceleration directed left. Similarly, the longitudinal acceleration sensor 104.

Figure 5:
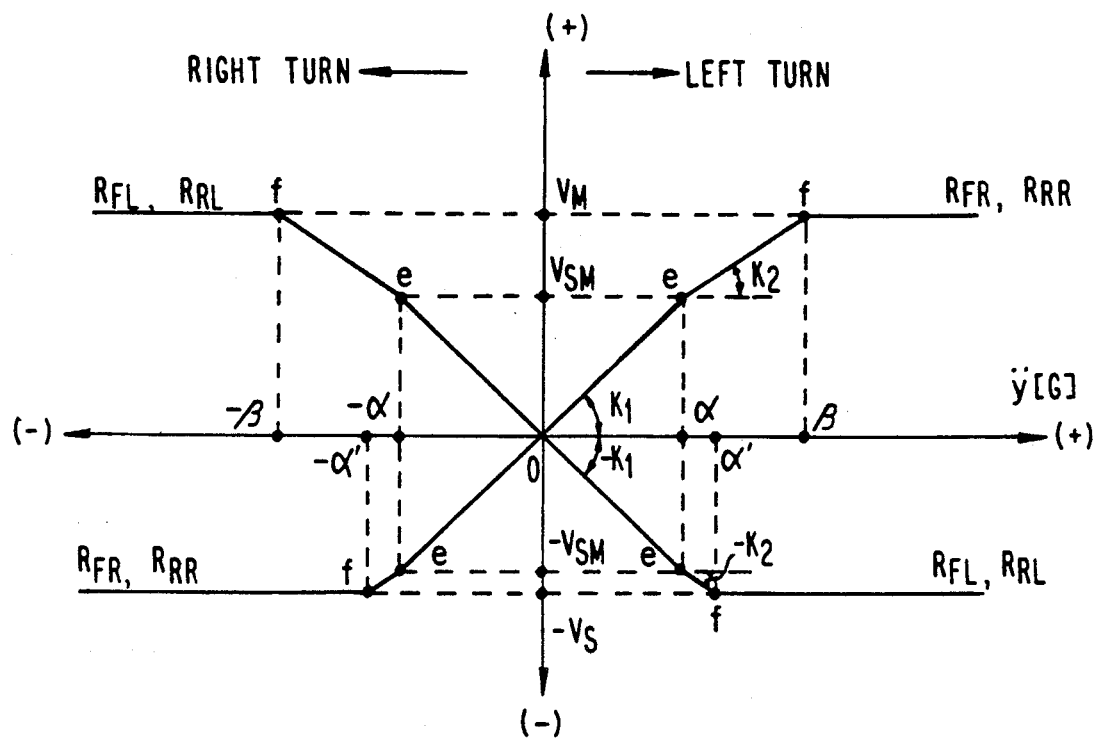
FIG. 5 is a chart showing variation of an anti-rolling suspension control command signal value versus magnitude of lateral acceleration exerted on a vehicular body.
Figure 6:
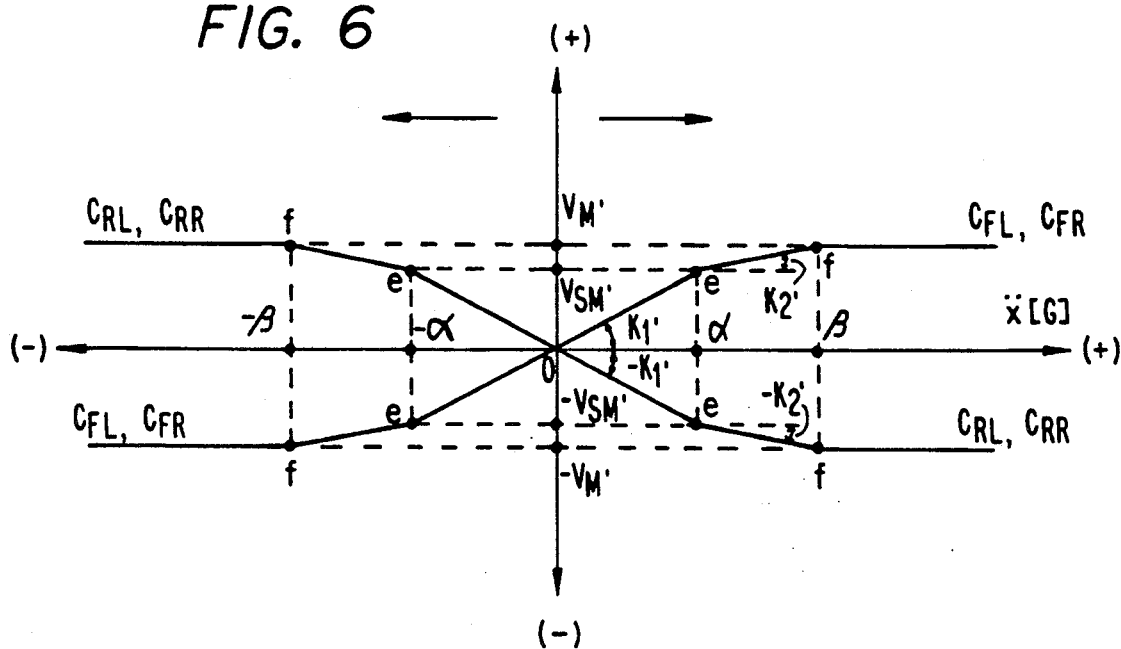
FIG. 6 is a chart showing variation of an anti-pitching suspension control command value signal versus magnitude of longitudinal acceleration exerted on the vehicular body.

FIGS. 5 and 6 show characteristics of variation of suspension control command signal values according to variation of the lateral and longitudinal acceleration indicative signal values $g_y$ and $g_x$. FIG. 5 shows variation of anti-rolling components $R_{FL}$, $R_{FR}$, $R_{RL}$ and $R_{RR}$ of the front-left, front-right, rear-left and rear-right suspension control command signals $V_{FL}$, $V_{FR}$, $V_{RL}$ and $V_{RR}$. On the other hand, FIG. 6 shows variation of anti-pitching components $C_{FL}$, $C_{FR}$, $C_{RL}$ and $C_{RR}$ of the front-left, front-right, rear-left and rear-right suspension control commands $V_{FL}$, $V_{FR}$, $V_{RL}$ and $V_{RR}$. In FIGS. 5 and 6, the anti-rolling components $R_{FL}$, $R_{FR}$, $R_{RL}$ and $R_{RR}$ and the anti-pitching components $C_{FL}$, $C_{FR}$, $C_{RL}$ and $C_{RR}$ are maintained zero (0) while the lateral and longitudinal accelerations y and x are maintained zero. On the other hand, the lateral acceleration toward right is generated in response to left-hand steering, the lateral acceleration indicative signal value $g_y$ becomes positive. In such case, the anti-rolling components $R_{FR}$ and $R_{RR}$ for the front-right and rear-right suspension systems become positive value and the anti-rolling components $R_{FL}$ and $R_{RL}$ become positive. As can be seen from FIG. 5, when the magnitude of lateral acceleration is within a range of greater than zero and smaller than or equal to a first predetermined lateral acceleration criterion α, e.g. 0.3 G, the variation rate of the anti-rolling commands $R_{FL}$, $R_{FR}$, $R_{RL}$ and $R_{RR}$ are maintained at $k_1$. At the lateral acceleration α, the anti-rolling components $R_{FR}$ and $R_{RR}$ become $+V_{SM}$ and the anti-rolling components $R_{FL}$ and $R_{RL}$ become $-V_{SM}$. On the other hand, when the magnitude of lateral acceleration is greater than the first lateral acceleration criterion α and smaller than or equal to a second lateral acceleration criterion β, e.g. 0.5 G, the variation rate of the anti-rolling components $R_{FR}$ and $R_{RR}$ become $k_2$, absolute value of which is smaller than $k_1$. On the other hand, at the left side suspension systems, the variation rate of the anti-rolling components $R_{FL}$ and $R_{RL}$ become $-k_2$ in a range of magnitude of acceleration greater than α and smaller than or equal to a third lateral acceleration criterion α' which is set greater than α and smaller than β. At the lateral acceleration β, the anti-rolling components $R_{FR}$ and $R_{RR}$ become $+V_M$. On the other hand, at the magnitude of lateral acceleration α', the anti-rolling components $R_{FL}$ and $R_{RL}$ become $-V_S$.

As can be seen FIG. 5, substantially symmetric pattern of variation of anti-rolling components are set for right-hand steering which induce lateral acceleration toward left.

On the other hand, as can be seen from FIG. 6, when the magnitude of rearward longitudinal acceleration (deceleration) is within a range of greater than zero and smaller than or equal to a first predetermined longitudinal acceleration criterion α, e.g. 0.3 G, the variation rate of the anti-pitching commands $C_{FL}$, $C_{FR}$, $C_{RL}$ and $C_{RR}$ are maintained at $k_1$. At the longitudinal acceleration α, the anti-pitching components $C_{FL}$ and $C_{FR}$ become $+V_{SM}'$ and the anti-pitching components $C_{RL}$ and $C_{RL}$ become $-V_{SM}'$. On the other hand, when the magnitude of longitudinal acceleration is greater than the first longitudinal acceleration criterion α and smaller than or equal to a second longitudinal acceleration criterion β, e.g. 0.5 G, the variation rate of the anti-pitching components $C_{FL}$, $C_{FR}$, $C_{RL}$ and $C_{RR}$ become $k_2$, absolute value of which is smaller than $k_1$. At the longitudinal acceleration β, the anti-pitching component becomes $+V_M'$.

As can be seen FIG. 6, substantially symmetric pattern of variation of anti-pitching components are set for right-hand steering which incude longitudinal acceleration toward left.

Figure 7:
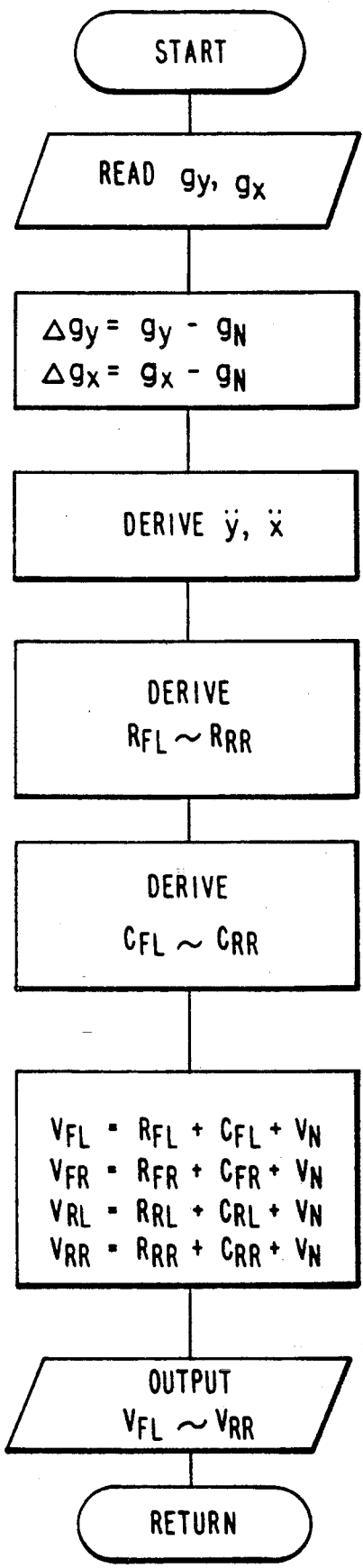
FIG. 7 is a flowchart showing suspension control routine to be executed by the preferred embodiment of the active suspension system according to the invention.
Figure 10:
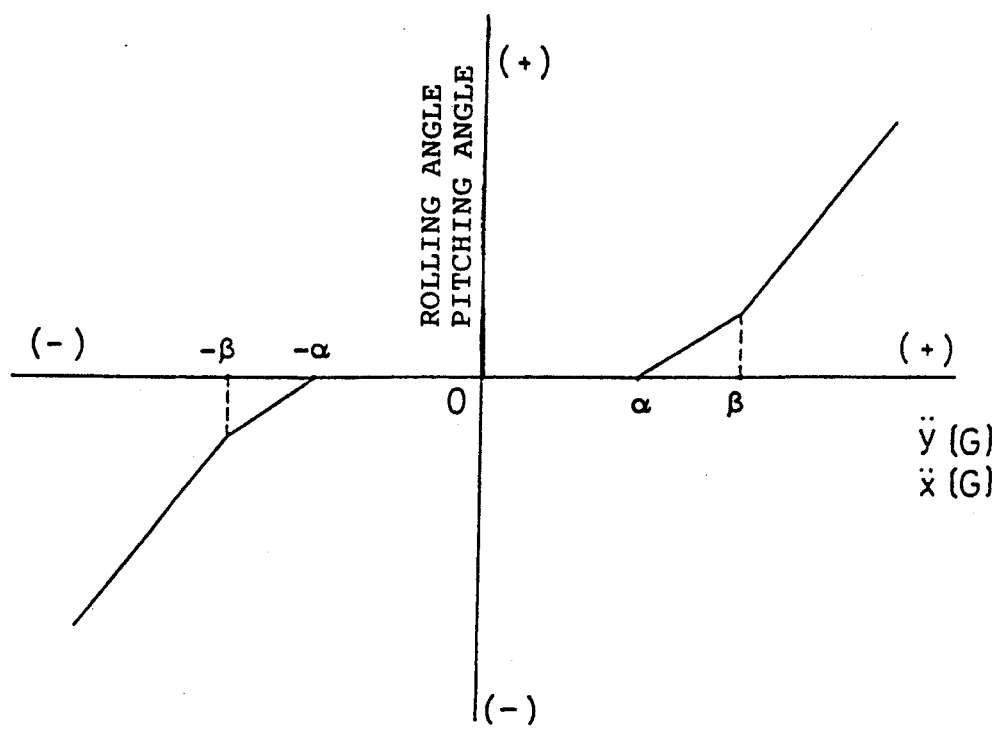
FIG. 10 is a chart showing rolling or pitching angle relative lateral or longitudinal acceleration.

The practical control operation to be taken place by the control unit 100 will be discussed with reference to FIG. 7, in which is shown a flowchart of a suspension control routine to be executed by the microprocessor 110. The shown routine is programmed as an interrupt routine to be executed at every given timing, e.g. every 20 msec.

Immediately after starting execution, the lateral and longitudinal acceleration indicative signals $g_y$ and $g_x$ are read out, at a step 1002. From the read lateral acceleration and longitudinal acceleration indicative signal values $g_y$ and $g_x$, a preset neutral acceleration indicative value $g_n$ is subtracted to derive lateral and longitudinal acceleration indicative data $\Delta g_y$ and $\Delta g_x$ are derived at a step 1004. Then, on the basis of the lateral and longitudinal acceleration indicative data $\Delta g_y$ and $\Delta g_x$, lateral and longitudinal acceleration data y and x are derived at a step 1006. In practice, the lateral and longitudinal acceleration data y and x are set in the memory unit 116 in forms of look-up tables. Therefore, in the practical operation at the step 1006, is table look-up for deriving the lateral and longitudinal acceleration data y and x in terms of the lateral and longitudinal acceleration indicative data $\Delta g_y$ and $\Delta g_x$.

At at step 1008, the anti-rolling components $R_{FL}$, $R_{FR}$, $R_{RL}$ and $R_{RR}$ are arithmetically derived on the basis of the lateral acceleration data y. Similarly, at a step 1010, the anti-pitching components $C_{FL}$, $C_{FR}$, $C_{RL}$ and $C_{RR}$ are derived by table lock-up in terms of the longitudinal acceleration data x.

Then, respective front-left, front-right, rear-left and rear right suspension control commands $V_{FL}$, $V_{FR}$, $V_{RL}$ and $V_{RR}$ utilizing the anti-rolling components $R_{FL}$, $R_{FR}$, $R_{RL}$ and $R_{RR}$ and the anti-pitching control components $C_{FL}$, $C_{FR}$, $C_{RL}$ and $C_{RR}$, at a step 1012. Practically, respective of the front-left, front-right, rear-left and rear right suspension control commands $V_{FL}$, $V_{FR}$, $V_{RL}$ and $V_{RR}$ are calculated by the following equation:

$$V_{FL} = R_{FL} + C_{FL} + V_N$$

$$V_{FR} = R_{FR} + C_{FR} + V_N$$

$$V_{RL} = R_{RL} + C_{RL} + V_N$$

$$V_{RR} = R_{RR} + C_{RR} + V_N$$

where $V_N$ is a neutral command value corresponding to the neutral pressure $P_N$.

At a step 1014, the front-left, front-right, rear-left and rear right suspension control commands $V_{FL}$, $V_{FR}$, $V_{Rl}$ and $V_{RR}$ are output to respectively corresponding driver circuits 122FL, 122FR, 122RL and 122RR via the D/A converters 120FL, 120FR, 120RL and 120RR. The driver circuits 122FL, 122FR, 122RL and 122RR then outputs the suspension control signals $I_{FL}$, $I_{FR}$, $I_{RL}$ and $I_{RR}$ for adjusting pilot pressure at respective of the pressure control valves 28FL, 28FR, 28RL and 28RR.

While the vehicle travels smooth straight road at constant speed, vehicular rolling and pitching will never induced. Therefore, the lateral acceleration indicative signal $g_y$ and the longitudinal acceleration indicative signal $g_x$ are maintained substantially the neutral values $g_N$. Therefore, the lateral and longitudinal acceleration data y and x derived at the step 1006 in the foregoing routine are maintained substantially zero. Therefore, the anti-rolling components $R_{FL}$, $R_{FR}$, $R_{RL}$ and $R_{RR}$, and the anti-pitching components $C_{FL}$, $C_{FR}$, $C_{RL}$ and $C_{RR}$ are maintained substantially zero. As a result, the suspension control command values $V_{FL}$, $V_{FR}$, $V_{RL}$ and $V_{RR}$ are substantially maintained at the neutral command signal value $V_N$. Therefore, the suspension control signals $I_{FL}$, $I_{FR}$, $I_{RL}$ and $I_{RR}$ have the current value $I_N$ corresponding to the neutral pressure $P_N$.

Assuming left-hand steering is performed, right-hand inertia force is exerted on the vehicular body to cause vehicular rolling for lowering the vehicular height at the right side and lifting up the left side. When, the lateral acceleration indicative signal value $g_y$ becomes greater than than zero. At this condition, the longitudinal acceleration indicative signal $g_x$ is maintained zero. As a result, the lateral acceleration indicative data $\Delta g_y$ derived at the step 1004 becomes greater than zero. Therefore, the lateral acceleration data y derived at the step 1006 becomes greater than zero.

Assuming that the lateral acceleration y is smaller than the first lateral acceleration criterion $\alpha$, the anti-rolling components $R_{FL}$, $R_{FR}$, $R_{RL}$ and $R_{RR}$ are derived with a variation rate $k_1$. In such case, the front-right and rear-right suspension control commands $V_{FR}$ and $V_{RR}$ are set greater than the front-left and rear-left suspension control commands $V_{FL}$ and $V_{RL}$. As a result, the fluid pressure in the working chambers 26d of the front-right and rear-right hydraulic cylinders 26FR and 26RR are gradually increased for harder suspension characteristics. In contrast, the fluid pressure in the working chambers 26d of the front-left and rear-left hydraulic cylinders 26FL and 26RL are gradually decreased for softer suspension characteristics. Therefore, lowering of the right side of the vehicular body can be suppressed by the hardened suspension characteristics of the front-right and rear-right suspension systems 14FR and 14RR and lifting up of the left side of the vehicular body can be suppressed by softer suspension characteristics of the front-left and rear-left suspension systems 14FL and 14RL. Therefore, the vehicular attitude can be successfully regulated.

When the lateral acceleration y is in a range between the first and second lateral acceleration criteria $\alpha$ and $\beta$, the anti-rolling component values $R_{FR}$ and $R_{RR}$ are derived with the variation rate of $k_2$. Since the variation rate $k_2$ is set at smaller value than $k_1$, variation rate of the anti-rolling component $R_{FR}$ and $R_{RR}$ versus variation of the lateral acceleration becomes smaller. On the other hand, while the lateral acceleration y is maintained within the first and third lateral acceleration criteria $\alpha$ and $\alpha'$, the anti-rolling component values $R_{FL}$ and $R_{RL}$ varies in a variation rate of $k_2$. When the lateral acceleration y becomes greater than the third lateral acceleration criterion $\alpha'$, the anti-rolling component values $R_{FL}$ and $R_{RL}$ becomes constant at the value $V_S$. Because of the smaller variation rate when the lateral acceleration y becomes greater than the first lateral acceleration criterion $\alpha$, vehicular rolling magnitude is moderately increased. When the lateral acceleration y becomes greater than the second lateral acceleration criterion $\beta$ anti-rolling components $R_{FR}$ and $R_{RR}$ becomes constant at $V_M$. As a result, increasing rate of magnitude of vehicular rolling becomes greater. By this, the drive may be able to recognize the vehicular driving condition cross to critical point.

On the other hand, when right hand steering is made, the lateral acceleration indicative signal value $y_g$ becomes smaller than the neutral value $g_N$. Therefore, the lateral acceleration data y becomes negative. Therefore, equivalent anti-rolling suspension control is performed for hardening left side suspension systems and softening right side suspension systems. In this case, when the lateral acceleration data y is maintained greater than the negative value of the first lateral acceleration criterion $-\alpha$, the variation rate of the suspension control command is maintained at $k_1$. When the lateral acceleration data y becomes smaller than $-\alpha$ and greater than $-\beta$, modulate left-hand rolling is induced.

As can be appreciated herefrom, by presence of the transition range of the lateral acceleration magnitude between $\alpha$ and $\beta$, in which modulate rolling is permitted, increasing of the rolling magnitude at the lateral acceleration y greater than the second lateral acceleration criterion $\beta$ will not surprise the driver and thus does not cause substantial degradation of the vehicular driveability.

Similarly, when the vehicular brake is applied for deceleration of the vehicle, the longitudinal acceleration indicative signal value $g_x$ is increased to be greater than the neutral value $g_N$. Therefore, the positive value of the longitudinal acceleration data c is derived. Therefore, the anti-pitching components $C_{FL}$ and $C_{FR}$ are increased for obtaining harder suspension characteristics at the front suspension systems 14FL and 14FR. On the other hand, the anti-pitching components $C_{RL}$ and $C_{RR}$ are decreased for obtaining softer suspension characteristics at the rear suspension systems 14RL and 14RR.

Here, if the longitudinal acceleration x is smaller than the first longitudinal acceleration criterion $\alpha$, the variation rate of the anti-rolling component is maintained at $k_1$. On the other hand, when the longitudinal acceleration x becomes greater than the first longitudinal acceleration criterion $\alpha$ and smaller than the second longitudinal acceleration criterion $\beta$, the variation rate of the anti-pitching component becomes $k_2$ which is smaller than $k_1$.

Similarly to the foregoing anti-rolling control, by providing the longitudinal acceleration magnitude range between $\alpha$ and $\beta$, in which modulate pitching is permitted, degradation of vehicular driving feeling or drivability at the longitudinal acceleration greater than $\beta$ will not be significant.

While the present invention has been discussed in terms of the preferred embodiment of the active suspension system, the invention can be embodied in various fashion. Therefore, the invention should be appreciated to include all possible embodiments and modifications which can be implemented without departing from the principle of the invention which is set out in the appended claims.

For instance, though the shown embodiment employs a lateral acceleration sensor for directly monitoring inertia moment exerted on the vehicular body, the equivalent parameter can be obtained by monitoring a vehicular speed and a steering angular position. Such a manner of detection of the laterally exerted inertia moment has been discussed in the Japanese Patent First (unexamined) Publication (Tokkai) Showa 62-293167. The disclosure of the above-identified Japanese publication is herein incorporated by reference. Furthermore, though the shown embodiment performs both of anti-rolling and anti-pitching suspension control, the invention is of course applicable for suspension system which performs either one of anti-rolling and anti-pitching control.

Also, the shown embodiment is directed to the control unit comprising a digital processor system for deriving the suspension control command. However, it is possible to formulate the equivalent control circuit by analog circuits. In the later case, the suspension control command may be derived by amplifying the lateral and/or longitudinal acceleration indicative signal with a predetermined amplifier gain. Furthermore, though the shown embodiment employs linear variation characteristics of the anti-rolling and anti-pitching components between the criteria, it may be possible to set two or more criteria for defining the variation characteristics of the anti-rolling and /or anti-pitching components. Further to say, the variation characteristics may be set in non-linear fashion, such as a curved characteristics. Therefore, concerning the variation characteristics, it is only essential matter for the present invention to reduce variation rate of the anti-rolling and/or anti-pitching components in greater acceleration range.

In addition, though the shown embodiment employs the same acceleration magnitude for setting the criteria for both of anti-rolling control and anti-pitching control, it is of course possible to employ mutually different acceleration magnitude for setting the criteria. Furthermore, though the shown embodiment has been concentrated to the hydraulic active suspension system, the algorithm of te invention may be applicable for various types of active suspension system and also applicable even for passive suspension systems.

What is claimed is:

1. A suspension control system for an automotive vehicle comprising:
    a plurality of suspension systems, each disposed between a vehicular body and a road wheel for damping relative displacement between said vehicular body and a road wheel, said suspension system being variable of suspension characteristics depending upon a suspension control command signal;
    a sensor means for monitoring inertial force exerted on the vehicular body for causing vehicular attitude change, said sensor means producing a sensor signal representative of monitored magnitude of the inertial force;
    a control means for receiving said sensor signal for deriving said suspension control command signal which is gradually variable between a predetermined minimum value corresponding to a first value of said sensor signal, and a maximum value corresponding to a second value of said sensor signal, which suspension control command signal is gradually variable according to variation of said sensor signal value, said control means gradually varying a variation rate of said suspension control command signal according to variation of said sensor signal value so that said variation rate of said suspension control signal is lower for signal at least in a sensor signal value range in the vicinity of said first and second values.

2. A suspension control system as set forth in claim 1, wherein said sensor signal value is variable between said first and second values and further across a third value set between said first and second values and corresponding to a vehicular state where inertial force exerted on the vehicular body is zero, and said variation rate of said suspension control command signal in the sensor signal range in the vicinity of said third value is greater than said variation rate in the vicinity of said first and second values.

3. A suspension control system as set forth in claim 2, wherein said suspension control command signal varies according to the variation of said sensor signal value at a first variation rate in a sensor signal value range between said third value and a fourth value greater than said third value and smaller than said second value, and at a second variation rate in sensor signal value range between said fourth value and said second value.

4. A suspension control system as set forth in claim 3, wherein said suspension control command signal varies according to the variation of said sensor signal value at a third variation rate in a sensor signal value range between said third value and a fifth value smaller than said third value and greater than said first value, and a fourth variation rate in a sensor signal value range between said fifth value and said first value.

5. A suspension control system as set forth in claim 2, wherein said variation rate is continuously varied so that a greater variation rate is obtained in the vicinity of said third value and a smaller variation rate is obtained in the vicinity of said first and second values.

6. A suspension control system as set forth in claim, 1, wherein said suspension control command signal are provided for one side of the vehicular body for hardening suspension control and for the other side of the vehicular body for softening suspension control for regulating vehicular attitude, said sensor signal value is variable between said first and second values and further across a third value set between said first and second values and corresponding to the vehicular state where an inertial force exerted on the vehicular body is zero, and said variation rate of said hardening suspension control command in a first sensor signal value range defined in the vicinity of said third value is greater than said variation rate in a second sensor signal value range defined in the vicinity of said first sensor signal value, and said variation rate of said softening suspension control command signal in a third sensor signal value range defined in the vicinity of said third sensor signal value is greater than the variation rate in a fourth sensor signal value range defined in the vicinity of said second sensor signal value.

7. A suspension control system as set forth in claim 6, wherein said fourth sensor signal value range is smaller than said second sensor signal value range.

8. An anti-rolling suspension control system for an automotive vehicle comprising:
    a plurality of suspension systems, each disposed between a vehicular body and a road wheel for damping relative displacement between said vehicular body and a road wheel, said suspension system being variable of suspension characteristics depending upon a suspension control command signal;
    a sensor means for monitoring lateral acceleration exerted on the vehicular body for causing vehicular attitude change, said sensor means producing a sensor signal representative of monitored magnitude of an inertial force;
    a control means for receiving said sensor signal for deriving said suspension control command signal which is for deriving said suspension control command signal which is gradually variable between a predetermined minimum value corresponding to a first value of said sensor signal, and a maximum value corresponding to a second value of said sensor signal, which suspension control command signal is gradually variable according to variation of said sensor signal value, said control means gradually varying a variation rate of said suspension control command according to variation of said sensor signal value so that said variation rate is lower at least in a sensor signal value range in the vicinity of said first and second values.

9. A suspension control system as set forth in claim 8, wherein said sensor signal value is variable across said first and second values and further across a third value set between said first and second values and corresponding to a vehicular state where lateral acceleration exerted on the vehicular body is zero, and said variation rate of said suspension control command in the sensor signal range in the vicinity of said third value is greater than said variation rate in the vicinity of said first and second values.

10. A suspension control system as set forth in claim 9, wherein said suspension control command signal varies according to the variation of said sensor signal value at a first variation rate in a sensor signal value range between said third value and a fourth value greater than said third value and smaller than said second value, and a second variation rate in a sensor signal value range between said fourth value and said first value.

11. A suspension control system as set forth in claim 10, wherein said suspension control command signal varies according to the variation of said sensor signal value at a third variation rate in a sensor signal value range between said third value and a fifth value smaller than said third value and greater than said first value, and a fourth variation rate in a sensor signal value range between said fifth value and said first value.

12. A suspension control system as set forth in claim 9, wherein said variation rate is continuously varied so that greater variation rate is obtained in the vicinity of said third value and smaller variation rate is obtained in the vicinity of said first and second values 13. A suspension control system as set forth in claim 8 wherein said suspension control command signals are provided for one side of the vehicular body for hardening suspension control and for the other side of the vehicular body for softening suspension control for regulating vehicular attitude, said sensor signal value is variable across said first and second values and further across a third value set between said first and second values and corresponding to a vehicular state where lateral acceleration exerted on the vehicular body is zero, and said variation rate of said hardening suspension control command signal in the first sensor signal range defined in the vicinity of said third value is greater than said variation rate in a second sensor signal value range defined in the vicinity of said first value, and said variation rate of said softening suspension control command signal in a third sensor signal range defined in the vicinity of said third sensor signal value is greater than the variation rate in a fourth sensor signal value range defined in the vicinity of said second value.

14. A suspension control system as set forth in claim 13, wherein said fourth sensor signal value range is smaller than said second sensor signal value range.

15. A suspension control system as set forth in claim 14, wherein said sensor signal value is variable across said first and second values and further across a third value set between and first and second values and corresponding to a vehicular state where longitudinal acceleration exerted on the vehicular body is zero, and said variation rate of suspension control command signal in the sensor signal range in the vicinity of said third value is greater than said variation rate in the vicinity of said first and second values.

16. A suspension control system as set forth in claim 15, wherein said suspension control command signal varies according to the variation of said sensor signal value at a first variation rate in a sensor signal value range between said third value and a fourth value greater than said third value and smaller than said second value, and a second variation rate in a sensor signal value range between said fourth value and said second value.

17. A suspension control system as set forth in claim 16, wherein said suspension control command signal varies according to variation of said sensor signal value at a third variation rate in a sensor signal value range between said third value and a fifth value smaller than said third value and greater than said first value, and a fourth variation rate in a sensor signal value range between said fifth value and said first value.

18. A suspension control system as set forth in claim 15, wherein said variation rate is continuously varied so that greater variation rate is obtained in the vicinity of said third valve and smaller variation rate is obtained in the vicinity of said first and second values.

19. An anti-pitching suspension control system for an automotive vehicle comprising:
a plurality of suspension systems, each disposed between a vehicular body and a road wheel for damping relative displacement between said vehicular body and a road wheel, said suspension system being variable of suspension characteristics depending upon a suspension control command signal;
a sensor means for monitoring longitudinal acceleration exerted on the vehicular body for causing vehicular attitude change, said sensor means producing a sensor signal representative of monitored magnitude of inertial force;
a control means for receiving said sensor signal for deriving said suspension control command signal which is gradually variable between a predetermined minimum value corresponding to a first value of said sensor signal, to a maximum value corresponding to a second value of said sensor signal, which suspension control command signal is gradually variable according to variation of said sensor signal value, said control means gradually varying a variation rate of said suspension control command according to variation of said sensor signal value so that said variation rate of said suspension control signal is lower at least in a sensor signal value range in the vicinity of said first and second values.

20. A suspension control system for an automotive vehicle comprising:
a plurality of suspension systems disposed between a vehicular body and road wheels respectively, each suspension system including a fluid cylinder which is variable of fluid pressure therein for regulating relative displacement between the vehicular body and the road wheel;
a fluid source for supplying working fluid to the fluid cylinders;
pressure control values for controlling pressures of the working fluid supplied from said fluid source to the fluid cylinders respectively;

a sensor for detecting acceleration acting on the vehicular body causing vehicular attitude change and providing a signal indicative thereof; and control means responsive to the signal from said sensor to provide pressure control signals to said pressure control values respectively, values of the pressure control signals being varied according to the magnitude of acceleration detected by said sensor, variation rates of the pressure control signal values being decreased according to increase in the acceleration.

21. A suspension control system as set forth in claim 20, wherein the values of the pressure control signals are varied between a predetermined minimum value corresponding to a first value of the detected acceleration and a predetermined maximum value corresponding to a second value of the detected acceleration across a neutral value corresponding to a third value of the detected acceleration indicating acceleration of zero, the variation rates of the pressure control signal values being decreased continuously as the pressure control signal values approach the predetermined minimum and maximum values from the neutral value.

22. A suspension control system as set forth in claim 20, wherein the values of the pressure control signals are varied between a predetermined minimum value corresponding to a first value of the detected acceleration and a predetermined maximum value corresponding to a second value of the detected acceleration across a neutral value corresponding to a third value of the detected acceleration indicating acceleration of zero, the variation rates of the pressure control signal values being varied at a first rate in a first range from the third value to a fourth value which is defined between the first and third values, at a second rate lower than the first rate in a second range from the first to fourth values, at a third rate in a third range from the third value to a fifth value which is defined between the third and second values, and at a fourth rate lower than the third rate in a fourth range from the fifth to second values.

23. A suspension control system as set forth in claim 22, wherein the first and third rates are equal to each other, the second and fourth rates being equal to each other.

24. A suspension control system as set forth in claim 22, wherein the first range is greater than the second range, the third range being greater than the fourth range.

* * * * *